United States Patent [19]

Rusk

[11] Patent Number: 4,526,547
[45] Date of Patent: Jul. 2, 1985

[54] WRITING AID AND METHOD OF TEACHING USING THE WRITING AID

[76] Inventor: Chris E. Rusk, 1007 Wayne Ave., Crawfordsville, Ind. 47933

[21] Appl. No.: 634,835

[22] Filed: Jul. 26, 1984

[51] Int. Cl.³ .................... G09B 11/00; B43L 15/00
[52] U.S. Cl. ........................................ 434/166; 401/6
[58] Field of Search ............... 434/162, 166, 112, 233; 401/6, 7, 8; 132/73

[56] References Cited

U.S. PATENT DOCUMENTS

| | | | |
|---|---|---|---|
| 794,329 | 7/1905 | Whitehouse | 401/6 |
| 843,767 | 2/1907 | Plach | 401/6 |
| 945,026 | 1/1910 | Faust | 401/6 |
| 1,793,945 | 2/1931 | Mauthe | 401/6 |
| 1,807,415 | 5/1931 | La France | 401/6 |
| 1,879,456 | 9/1932 | Parsons | 401/7 |
| 2,864,384 | 12/1958 | Walter | 132/73 |
| 3,501,849 | 3/1970 | Olsen | 434/233 |
| 3,947,977 | 4/1976 | Bishop | 401/6 X |
| 4,030,841 | 6/1977 | Balasty | 401/6 |
| 4,076,427 | 2/1978 | Anderson | 401/6 |
| 4,149,811 | 4/1979 | Coffman | 401/6 |
| 4,167,347 | 9/1979 | Hoyle | 401/88 |

FOREIGN PATENT DOCUMENTS 39911 9/1973 Australia .......................... 434/166

OTHER PUBLICATIONS

*Newsweek*, "Automated Teachers", Jul. 20, 1964, p. 55.

*Primary Examiner*—William H. Grieb
*Attorney, Agent, or Firm*—Barnes & Thornburg

[57] ABSTRACT

A method for teaching persons how to hold writing instruments properly is disclosed along with a writing aid for facilitating the method of teaching. The first step of the method is to provide a device for aiding in the gripping of the writing instrument. The device includes a body having a central bore for grippingly receiving the writing instrument, and an exterior surface. The exterior surface includes a first gripping surface positioned for receiving the user's first finger, a second gripping surface positioned for receiving the user's second finger, and a third gripping surface positioned for receiving the user's third finger. A second step in the process is to provide a surface indicia on at least one of the first, second, and third gripping surfaces. The third step of the process is to instruct the user to place the proper one of his fingers on the surface bearing the indicia.

14 Claims, 5 Drawing Figures

WRITING AID AND METHOD OF TEACHING USING THE WRITING AID

The present invention relates to a method of teaching penmanship, and more particularly to a method of teaching persons, especially children, how to hold writing instruments properly. The present invention also relates to a writing aid for facilitating the teaching of persons how to hold writing instruments.

Persons, such as young children who are first learning how to write, often grip writing instruments, such as pencils and pens improperly. Absent instruction to the contrary, a child will generally grip a pencil in a manner most comfortable to him. This gripping position may or may not be a proper position for gripping the pencil.

Many children develop bad pencil-holding habits, which can impede their progress in learning how to write properly and neatly. Additionally, some children may grip a pencil in a manner which, although seemingly comfortable when the pencil is first gripped, can lead to excessive fatigue when the child has to write extensively.

Whitehouse U.S. Pat. No. 794,329 illustrates a finger guard for pencils which is designed to help beginners hold pencils properly. Whitehouse's finger guard includes a sleeve which is formed with three finger rests, one for the forefinger, one for the second finger, and one for the thumb.

Other devices are known which can be inserted on a pencil or pen for making the pencil or pen more comfortable to use. See, e.g., Bishop U.S. Pat. No. 3,947,977; Faust U.S. Pat. No. 945,026; Mauthe U.S. Pat. No. 793,945; Balasty U.S. Pat. No. 4,030,841; and Hoyle U.S. Pat. No. 4,167,347.

Other devices are known which comprise writing instruments which have barrels which are formed to provide a more comfortable ripping surface for the user. For example, Anderson U.S. Pat. No. 4,076,427 discloses a writing instrument having a shaft which is formed with three elongated concave indentations. Coffman U.S. Pat. No. 4,149,811 discloses a style handle for a writing instrument having three essentially flat surfaces which are arranged in a triadic spiral at a selected pitch, to conform with an individual's finger grip when the style is held in a normal manner. La France U.S. Pat. No. 1,807,415 relates to a fountain pen with a barrel having three flattened portions. Plach U.S. Pat. No. 843,767 relates to a curvilinear pen handle having curved grooves which are adapted to hold the fingers in a correct position. The present invention improves upon the above known art by providing a writing aid which is usable in conjunction with a method of teaching children how to grip writing instruments properly.

One object of the present invention is to provide a writing aid which is adapted for teaching children how to hold a writing instrument properly. Another object of the present invention is to provide a writing aid which facilitates the instruction of younger children and large groups of children.

In accordance with the present invention, a method is provided for teaching persons how to grip a writing instrument properly. The first step of the method is to provide a device for aiding in the gripping of the writing instrument. The device includes a body having a central bore for receiving the writing instrument and engaging an exterior surface thereof. An exterior surface of the body includes a first surface positioned for receiving the user's first finger, a second surface positioned for receiving the user's second finger, and a third surface positioned for receiving the user's third finger. A second step in the process is to provide a surface indicia means on at least one of the first, second, and third surfaces. The third step of the process is to instruct the user to place the proper one of his fingers on the surface bearing the indicia means.

In a preferred method, a different surface indicia means is provided on each of the three finger-receiving or gripping surfaces. The user is also provided with three user indicia means which are similar to the three surface indicia means. The user indicia means are attached to the first, second, and third fingers of the user to enable the user to match the user indicia means on his fingers with the surface indicia means on the gripping surfaces of the writing aid.

One feature of the method of the present invention is that the method incorporates the use of indicia on either the writing aid, the user's finger, or both. This feature has the advantage of providing a means for enabling a child to learn how to properly orient his finger on the writing instrument by, for example, placing his finger on the surface of the instrument having the proper indicia. This feature is especially advantageous to large group instruction. For example, if a large class of students were provided with identical writing aids having a first gripping surface colored red, a teacher could instruct the students to place their first fingers (thumbs) on the red surface. Once this was accomplished, the children's second and third fingers would become oriented on the second and third gripping surfaces, respectively.

Also in accordance with the present invention, a device is provided for aiding in the gripping of a writing instrument. The device comprises a body having a central bore for receiving the writing instrument and an exterior. The exterior includes a first gripping surface which is positioned for receiving the user's first finger, and a second gripping surface which is generally coextensive with the first gripping surface. The second gripping surface is positioned for receiving the user's second finger. A third gripping surface is provided which is generally coextensive with the second gripping surface. The third gripping surface is positioned for receiving the user's third finger. At least one of the first, second, and third gripping surfaces includes a surface indicia means. The surface indicia means provides a reference for the placement of at least one of the user's fingers.

In the preferred embodiment, the body of the writing aid has a length which is generally egual to its diameter. Additionally, different indicia means are provided for each of the first, second, and third gripping surfaces. A first, second, and third user indicia means are provided which are similar to the first, second, and third surface indicia means.

One aspect of the present invention is that the gripping surfaces of the writing aid are generally coextensive. This has the advantage of establishing a relative orientation of the user's fingers which the user will find comfortable when the user stops using the writing aid and begins placing his fingers on the pencil directly.

Another aspect of the present invention is that the exterior includes a raised ridge portion which is angled from the long axis of the writing instrument and extends between the first and second gripping surfaces. The raised ridge portion is provided for maintaining the user's first and second fingers in a spaced relation.

One feature of the present invention is that the writing aid is relatively thick. For example, it can have a diameter generally as large as its length. This feature has the advantage of making the writing aid easy to grip by youngsters who often lack the coordination to grip a relatively thin pencil. Additionally, the relatively short length of the writing aid prevents it from interfering with the fleshy interspace portion of the user's hand between his first finger (thumb) and second finger.

It is also a feature of one embodiment of the present invention to provide means for holding a user's hand onto the writing aid. This means can include a mating material applied to the gripping surfaces of the writing aid, and a mateable material applied to a glove on the user's hand. The mating and mateable materials can be made of a material such as VELCRO. This feature is especially advantageous with either old, disabled, or arthritic patients who have difficulty maintaining a steady grip on a pencil.

These and other features of this invention and their inherent advantages will become apparent to those skilled in the art from the following description of preferred embodiments and the accompanying drawings illustrating the best mode of carrying out the invention as presently conceived wherein.

Figure 1:
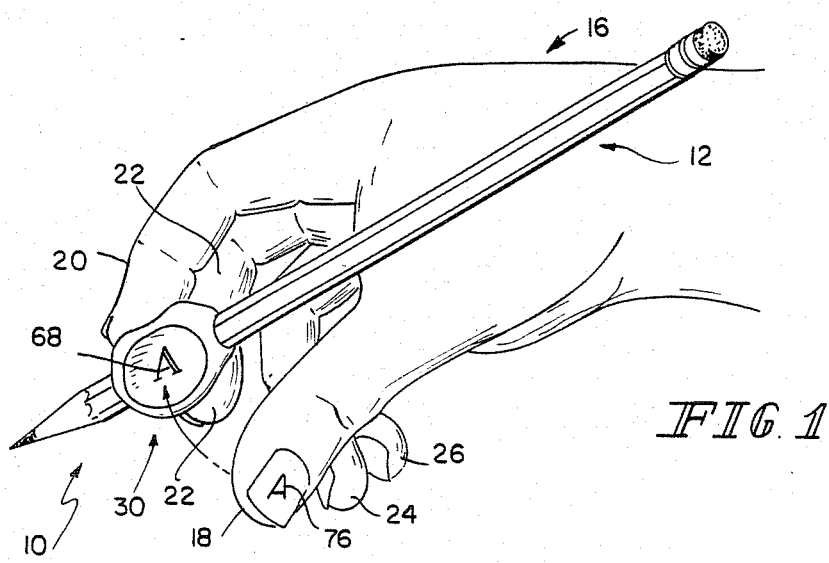
FIG. 1 is a perspective view of the present invention illustrating the orientation of the present invention with respect to the user's hand.

The writing aid 10 of the present invention is shown in the figures. The writing aid 10 shown in the figures is intended for use by right handed writers, although it will be appreciated that a left handed model could be provided also. The writing aid 10 is mounted on a writing instrument such as a pen (not shown), a crayon (not shown) or a pencil 12, and is positioned to be gripped by a user's hand 16, to aid the user in gripping the pencil 12. The user's hand 16 includes five fingers, a first finger 18 (thumb), a second finger 20, a third finger 22, a fourth finger 24, and a fifth finger 26. The writing aid 10 is designed to be gripped by the first three fingers 18, 20, 22 which are the normal fingers one uses to grip a pencil 12 for writing.

The writing instrument 10 includes a body 30 having a length L which is generally about egual to its diameter D. In one embodiment, the writing aid 10 has a length of one inch (2.54 cm) and a diamter of one inch (2.54 cm). A central bore 32 extends longitudinally through the body for receiving the pencil 12. Preferably, the body 30 is made from a resilient material such as a rubber or plastic to permit some stretching. The body 30 can be made by an injection-molding process or other known method. The central bore 32 can be formed to have an apron portion 35 at the end of the bore 32 which will be placed closest to the point of the pencil 12. The apron portion 35 preferably comprises a thin, resilient, annular flap having a smaller diameter than the bore 32, and is provided for gripping the exterior of the pencil 12. The configuration of the apron portion 35, and the positioning of the apron portion 35 on the end of the writing aid 10 adjacent the point of the pencil enables the writing aid 10 to be slid upwardly (away from the point) along the exterior of the pencil 12 as the pencil is sharpened, but helps prevent the writing aid from being slid downwardly (toward the point) on the pencil when downward pressure is applied on the writing aid 10. Alternatively, the central bore 32 can be formed to have a diameter which is slightly smaller than the outer diameter of the writing instrument 12 which the bore 32 receives. The resiliency of the material from which the body 30 is made permits the diameter of the bore 32 to expand to receive the pencil 12 and grip the pencil 12 securely.

The body 30 has an exterior upon which first, second, and third gripping surfaces 40, 42, and 44 are formed. The first gripping surface 40 is positioned for receiving the user's first finger 18. The second gripping surface 42 is generally longitudinally coextensive with the first gripping surface 40, and is positioned for receiving the user's second finger 20. The third gripping surface 44 is generally longitudinally coextensive with the second gripping surface 42 and is positioned for receiving the user's third finger 22. Longitudinally coextensive is used herein to mean that the surfaces 40, 42 and 44 are at approximately the same longitudinal position on the writing aid 10, and are arranged on the body 30 within a common band or region, and not dramatically staggered or dispersed.

Figure 2:
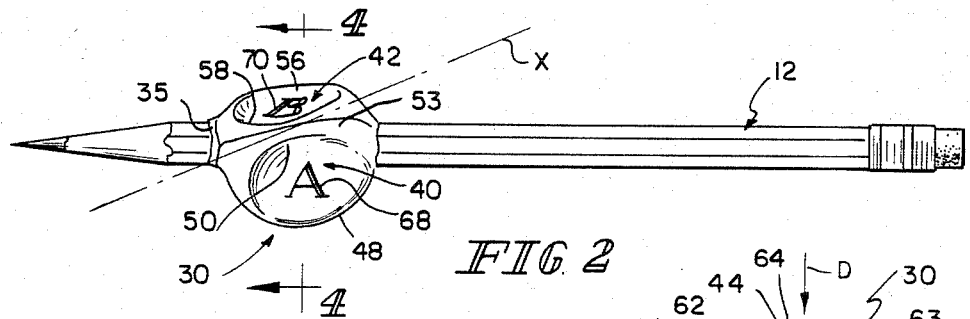
FIG. 2 is a side view of the present invention.
Figure 4:
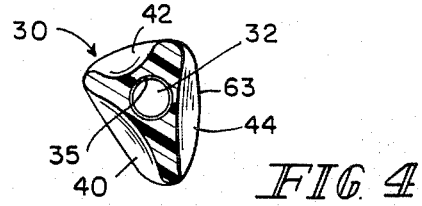
FIG. 4 is a sectional view of the present invention taken along lines 4—4 of FIG. 2.
Figure 3:
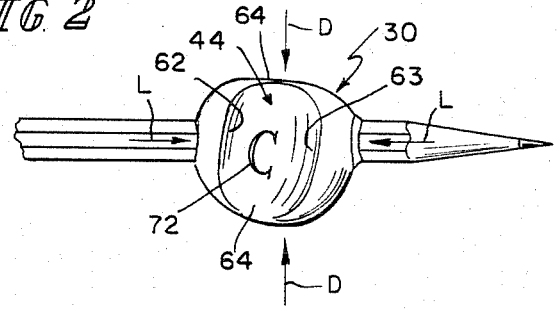
FIG. 3 is a side view of the present invention taken from the side opposite to that shown in FIG. 2.

The first gripping surface 40 has a generally planar proximal end 48 which terminates in a raised rim at its distal end 50. The distal end 50 of the first gripping surface 40 is adjacent a raised ridge portion 53 which extends between the first 40 and second 42 ripping surfaces. The raised ridge 53 extends at an angle from the long axis of the pencil 12 between about 5° and 30°, and preferably between about 20° and 30°, as indicated by line X in FIG. 2. The second gripping surface 42 is similarly shaped, but usually narrower than the first gripping surface 40, and includes a planar proximal end portion 56 and a distal end position 58. The distal end portion 58 terminates in a raised rim adjacent the raised ridge portion 53. The first 40 and second 42 gripping surfaces are configured to engage the first 18 and second 20 fingers, respectively, to position the fingers 18, 20 at an angle which is preferably between about 30° to 45° from the long axis of the pencil 12. The third gripping surface 44 includes a pair of raised side rims 62, 63 and a pair of generally planar ends 64. Side rim 63 is formed to extend radially outwardly further than side rim 62, to provide a comfortable resting surface for third finger 22. The third surface 44 is positioned to orient the third finger 22 at about a 90° angle to the long axis of the pencil 12.

Each of the gripping surfaces 40, 42, 44 includes a surface indicia means 68, 70, 72. The first surface indicia means 68 is placed on the first gripping surface 40. The second surface indicia means 70 is placed on the second gripping surface 42, and the third surface indicia means 72 is placed on the third gripping surface 44. In the embodiment shown in the figures, the first, 68 second, 70 and third 72 surface indicia means are illustrated as adhesive tags bearing the legends A, B, and C, respectively, which are adhesively attached onto the first 40, second 42, and third 44 gripping surfaces respectively. The surface indicia means 68, 70, 72 can take forms other than lettered tags. In one embodiment (not shown), the surface indicia 68, 70, 72 can comprise gripping surfaces 40, 42, 44 having different colors. For example, the first gripping surface 40 can be colored red, the second gripping surface 42 can be colored white, and the third gripping surface 44 can be colored blue. Alternatively, the indicia means 68, 70, 72 can be adhesive tags bearing likenesses of cartoon characters. The surface indicia means 68, 70, 72 are preferably chosen to be something readily identifiable by and interesting to children.

User indicia means can also be provided. The user indicia means 76 are placed on the hand 16 of the user to enable the user to match the indicia means 76 on his hand 16 with the surface indicia means 68, 70, 72 on the writing aid 10. For example, the first user indicia means 76 is shown as an adhesive tag bearing the legend A which can be placed on the fingernail of the user's first finger 18, and is generally similar to the surface indicia means 68 placed on the first ripping surface 40 of the writing aid 10. The user can match the first user indicia means 76 with the first surface indicia means 68 to indicate to him that his first finger 18 is to be placed on the first surface 40 of the writing aid 10. Although the user indicia means 76 is shown as a tag bearing a letter legend, they can bear a variety of forms, similar to the variety discussed in connection with the surface indicia means 68, 70, 72.

The writing aid 10 of the present invention facilitates the present invention's method of teaching a person how to grip a writing instrument properly. One method for teaching a person how to properly hold a pencil 12 is to instruct the person to match one of their first 18, second 20, or third 22 fingers with the proper one of the surface indicia means 68, 70, 72. For example, a child can be instructed to place its thumb (first finger 18) on the surface marked A. Once this is so accomplished, the second 20 and third 22 fingers will naturally tend to grip the second and third surfaces 42 and 44, respectively. The shape and configuration of these surfaces 40, 42, 44 orient the child's hand 16 on the writing aid 10 properly and foster the development of a proper technique for holding a writing instrument 12 even when the writing aid 10 is no longer used.

The method of instruction of the present invention is especially useful in group situations, such as in a kindergarten classroom wherein a teacher is trying to teach a number of students how to hold a pencil properly. For example, in a classroom, the writing aids 10 given to the students may all have their first surfaces 40 colored red, their second surfaces 42 colored white, and their third surfaces 44 colored blue. The teacher could then instruct all the children to place their thumbs (first fingers) on the red surface 40. Once this was accomplished, the children's second and third fingers 20, 22 would naturally be inclined to rest upon the second and third surfaces 42, 44. The configuration of the three surfaces 40, 42, 44 orients the children's fingers in the proper relative positions. Continuing with the foregoing example, once the teacher had established, in the minds of the students, the connection between their thumbs and the color red, the students would need no further instruction on the proper placement of their hands 16 about the writing aid 10. After the children had a chance to become accustomed, through the use of the writing aid 10, to the proper orientation of their fingers 18, 20, 22 on pencils 12, the writing aids could be removed from the pencils. At this point, the habits that the children developed through the use of the writing aid 10 would be sufficiently reinforced, so that even without the writing aid 10 the children would be very likely to orient their hands and fingers on the pencils properly. A surface indicia means can be placed on one or all of the gripping surfaces 40, 42, 44, depending upon the preferences of the individual teacher.

Another method for teaching children how to properly hold a writing instrument 12 is accomplished with the use of user indicia means 76, which are placed on the hands 16 of the user. This method is especially useful in situations wherein there is insufficient time or manpower to supervise the children closely. The user indicia means 76 for the first finger 18 is preferably similar to the surface indicia means 68 applied on first surface 40. The similarity between the two indicia means 76, 68 enables a child to match his first finger 18 to the first surface 40, and provides a strong suggestion to the child that his first finger 18 should be placed on the first surface 40. Likewise, a second user indicia means (not shown) which is different than the first user indicia means 76, but similar to the surface indicia means 70 used on second surface 42 will help the child learn that his second finger 20 should be placed on second surface 42. Once the child is instructed to place his finger bearing a user indicia means, such as 76, on the surface of the writing aid 10 having a surface indicia means 68 which matches the user indicia means 76 on that finger, the child will be able, on his own, to orient his fingers 18, 20, and 22 properly on the proper surfaces of the writing aid 40, 42, 44, respectively, without further instruction.

Figure 5:
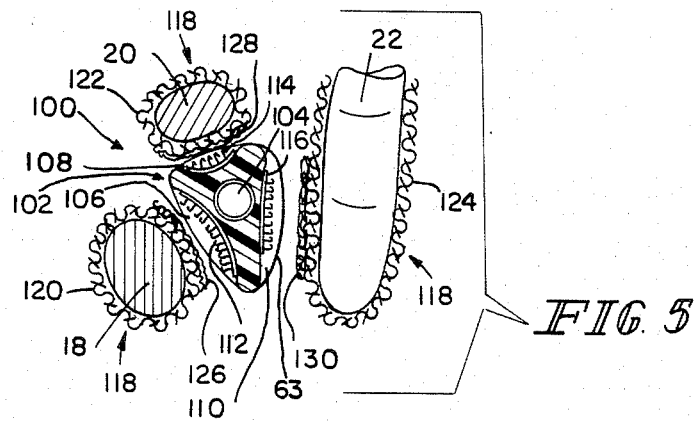
FIG. 5 is a sectional view, similar to that shown in FIG. 4, of an alternate embodiment of the present invention.

A second embodiment 100 of the present invention is shown in FIG. 5. This second embodiment 100 is especially helpful for persons who have a difficult time maintaining a secure grip on a writing instrument 10. Such persons include those suffering from arthritis, Lou Gehrig's disease, various palsies associated with old age and other motor skill disorders.

Writing aid 100 includes a body 102 having a central bore 104. The body 102 includes an exterior having a first gripping surface 106, a second gripping surface 108, and a third gripping surface 110. Writing aid 100 is similar to writing aid 10, in the above-mentioned respects, although it 100 may have a larger size to accommodate the hands of older persons, which are normally larger than the hands of children. A swatch of mating material 112, 114, 116 is placed on each of the first, second, and third gripping surfaces 106, 108, and 110, respectively. The mating material 112, 114, 116 is preferably made of a textile hook and eye fastening material such as VELCRO. The user (not shown) is provided with a glove means 118 which may take the form of either a full-hand glove or of flexible, elongated tubular finger coverings. Alternatively, the glove means 118 can be a three-fingered glove wherein only the first 18, second 20, and third 22 fingers are covered. The glove 118 includes a first finger receiving portion 120, a second finger-receiving portion 122, and a third finger-receiving portion 124. A swatch of mateable material 126, 128, and 130 is placed on the exterior surface of each of the first, second, and third finger-receiving portions 120, 122, and 124, respectively. The mateable material is preferably also made of VELCRO. The mateable material 126, 128, and 130 is positioned on the finger-receiving portions 120, 122, and 124 to mate with the mating material 112, 114, 116 when the user's fingers are properly placed on the gripping surfaces 106, 108, and 110.

The increased diameter provided by the writing aid 100 enables a writing instrument 12 to be gripped more easily by persons who have difficulty doing so, such as those persons described above. Additionally, the gripping of the mating material 112, 114, 116 by the mateable material 126, 128, 130 helps to secure the user's hand 16 onto the writing instrument. This helps a user maintain his hand around the writing instrument 12 which enables a user to write more easily.

Although the invention has been described in detail with reference to the illustrated preferred embodiments, variations and modifications exist within the scope and spirit of the invention as described and as defined in the following claims.

What is claimed is:

1. A method for teaching a young child how to grip an elongated, hand-held writing instrument properly, comprising the steps of
   providing a device for aiding in the gripping of the writing instrument, the device including a body having a central bore for receiving the writing instrument, and an exterior surface having a first gripping surface positioned for receiving the person's first finger, a second gripping surface positioned for receiving the person's second finger and a third gripping surface positioned for receiving the person's third finger,
   providing a surface indicia means on at least one of the first, second, and third gripping surfaces, the surface indicia means comprising one of the first, second, and third gripping surfaces having a color different than the color of the other two of the first, second, and third gripping surfaces, and
   instructing the young child to place a designated one of his fingers on the surface bearing the indicia means.

2. The method of claim 1 further comprising the steps providing a user indicia means similar to the surface indicia means and attaching the user indicia means to a finger of the person.

3. The method of claim 1 wherein the step of providing a surface indicia means comprises the steps of providing a first surface indicia means of a first color on the first gripping surface, a second indicia means of a second color on the second gripping surface, and a third indicia means of a third color on the third gripping surface.

4. The invention of claim 3 further comprising the steps of providing a first user indicia means similar to the first surface indicia means, attaching the first user indicia means to the child's first finger, providing a second user indicia means similar to the second surface indicia means, attaching the second user indicia means to the child's second finger, and providing a third user indicia means similar to third surface indicia means and attaching the third user indicia means to the child's third finger.

5. The method of claim 4 wherein the steps of providing user indicia means and surface indicia means comprises the steps of providing adhesive tags attachable to the child's fingers and gripping surfaces.

6. A device for aiding in teaching a young child to grip an elongated hand-held writing instrument properly, comprising
   a body having a central bore for receiving the elongated, hand-held writing instrument and an exterior, the exterior including
   a first gripping surface positioned for receiving the user's first finger, a second gripping surface positioned for receiving the user's second finger, and a third gripping surface generally co-extensive with the second gripping surface and positioned for receiving the user's third finger, at least one of the first, second, and third gripping surfaces including a surface indicia means for providing a reference for placement of at least one of the child's fingers, the surface indicia means comprising the one surface having a color different than the color of the other two of the first, second, and third gripping surfaces.

7. The invention of claim 6 wherein each of the first, second, and third gripping surfaces includes surface indicia means, the indicia means comprising the first gripping surface having a first color, the second gripping surface having a second color, and the third gripping surface having a third color.

8. The invention of claim 6 further comprising a user indicia means placeable on one of the fingers of the user, and corresponding with the color of the one gripping surface corresponding to that finger, for facilitating placement by the user of his fingers on the corresponding gripping surfaces.

9. The invention of claim 8 wherein the user indicia means comprises an adhesive tag placeable on one of the user's fingers.

10. The invention of claim 8 wherein the user indicia means comprises an adhesive tag placeable on one of the fingers of the user, and the surface indicia means comprises a similar adhesive tag placeable on the one surface.

11. A device for aiding in the gripping of a writing instrument comprising
    a body having a central bore for receiving the writing instrument, and an exterior, the exterior including
    a first gripping surface positioned for receiving the user's first finger, a second gripping surface generally co-extensive with the first gripping surface and positioned for receiving the user's second finger, and a third gripping surface generally co-extensive with the second gripping surface and positioned for receiving the user's third finger, at least one of the first, second, and third gripping surfaces including a surface indicia means for providing a reference for the placement of at least one of the user's fingers, and
    a mating material attached to one of the first, second, and third surfaces, and a glove means wearable on at least one of the user's fingers, the glove means including a mateable material for gripping the mating material attached to the at least one gripping surface.

12. The invention of claim 11 wherein the mating and mateable material comprise hook and eye textiles.

13. The invention of claim 11 wherein each of the first, second, and third gripping surfaces includes a mating material attached to their surfaces and the glove means includes first, second, and third portions wearable on the user's first, second, and third fingers, each of the first, second, and third portions including a mateable material for gripping the mating material on the corresponding gripping surfaces.

14. A device for aiding in the gripping of a writing instrument, comprising
    a body having a central bore for receiving the writing instrument and an exterior, the exterior including
    a first gripping surface positioned for receiving the user's first finger, a second gripping surface generally co-extensive with the first gripping surface and positioned for receiving the user's second finger, a third gripping surface generally co-extensive with the second gripping surface and positioned for receiving the user's third finger,
a mating material attached to one of the first, second, and third surfaces, and a glove wearable on at least one of the user's fingers, the glove means including a mateable material for gripping the mating material attached to the at least one gripping surface.

* * * * *